United States Patent [19]

Jannson et al.

[11] Patent Number: 4,958,892
[45] Date of Patent: Sep. 25, 1990

[54] DIFFRACTION COHERENCE FILTER

[75] Inventors: Tomasz P. Jannson; Joanna L. Jannson, both of Torrance, Calif.

[73] Assignee: Physical Optics Corporation, Torrance, Calif.

[21] Appl. No.: 259,304

[22] Filed: Oct. 18, 1988

[51] Int. Cl.$^5$ ............................................. G03H 1/02
[52] U.S. Cl. .................................. 350/3.6; 350/3.61; 350/3.67; 350/172
[58] Field of Search ......................... 350/3.6, 3.66, 3.7, 350/3.75, 3.77, 3.78, 162.11, 162.17-162.22, 162.19, 3.85, 320, 321; 356/354-356

[56] References Cited

U.S. PATENT DOCUMENTS 4,925,271  5/1990  Taniura ............................... 350/172

Primary Examiner—Bruce Y. Arnold
Assistant Examiner—Thong Nguyen
Attorney, Agent, or Firm—Nilles & Nilles

[57] ABSTRACT

A diffraction coherence filter based on Bragg interference principles comprises a plurality of spaced-apart lower-hierarchy optical elements, containing a series of interference structures, which form a higher-hierarchy compound optical structure. The spatial distribution of the lower-hierarchy optical element and the interference structures is governed by mathematical relationships dependent upon the coherence radius and temporal coherence length of incoming radiation. All of the lower-hierarchy elements can be coherently coupled for coherent light and randomly coupled for incoherent light, whereby the filter may differentiate between coherent and incoherent radiation.

4 Claims, 10 Drawing Sheets

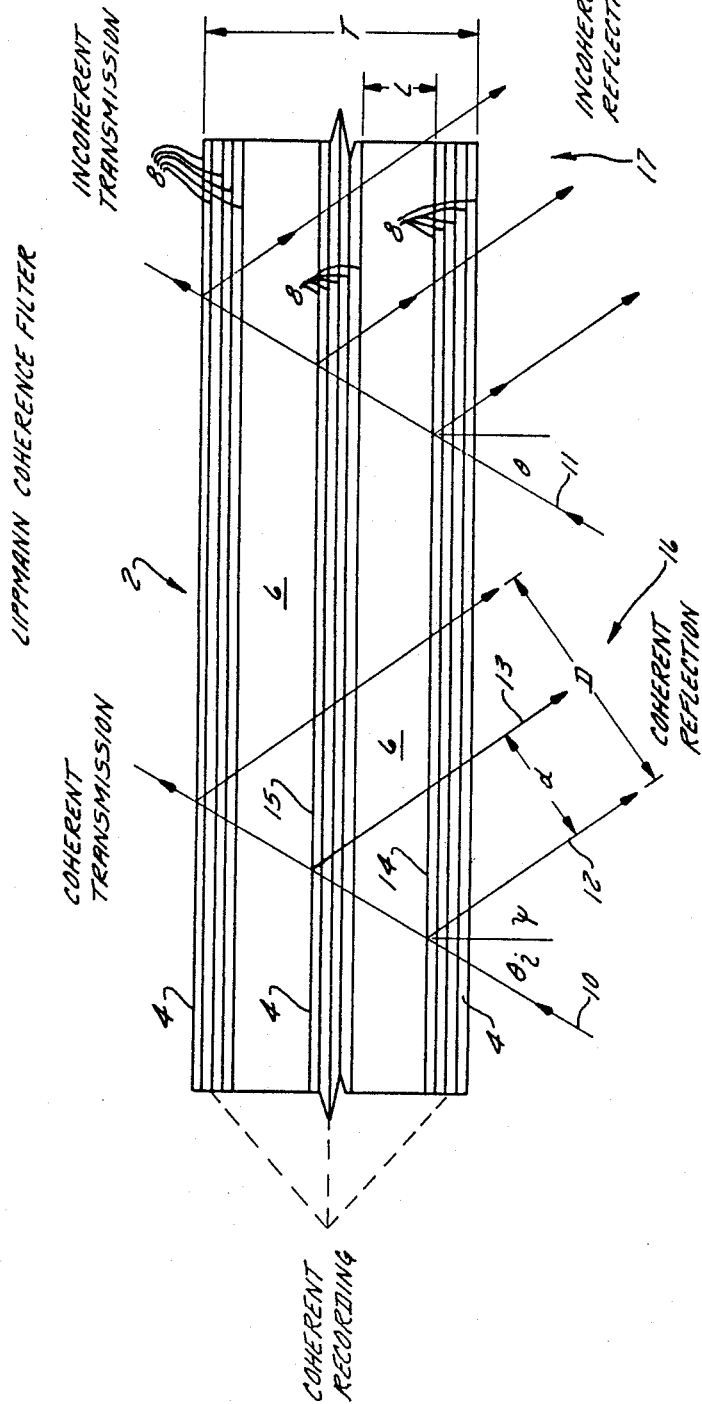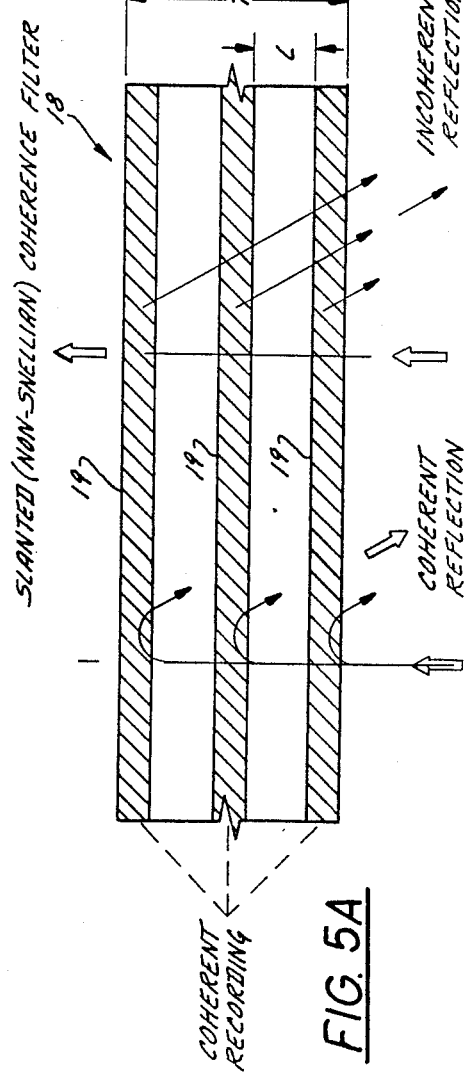

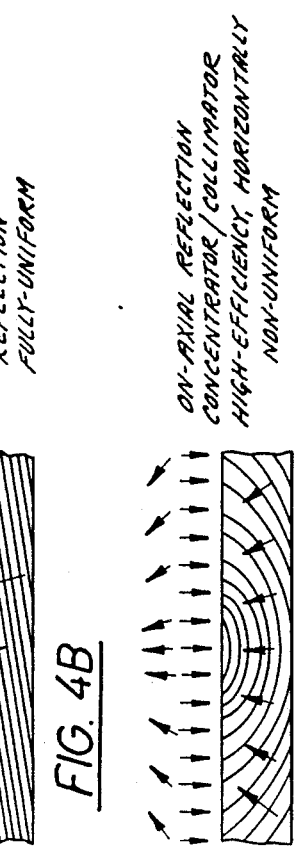
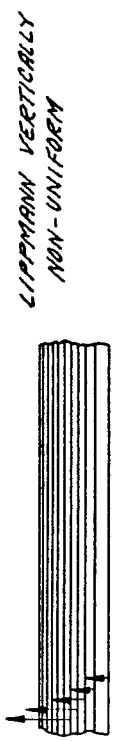
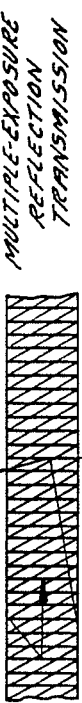

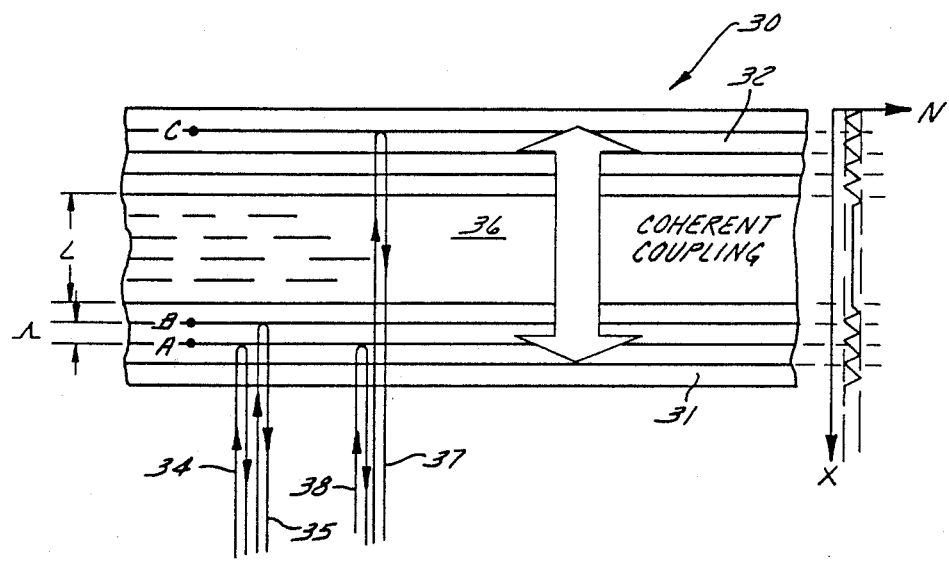
FIG. 7
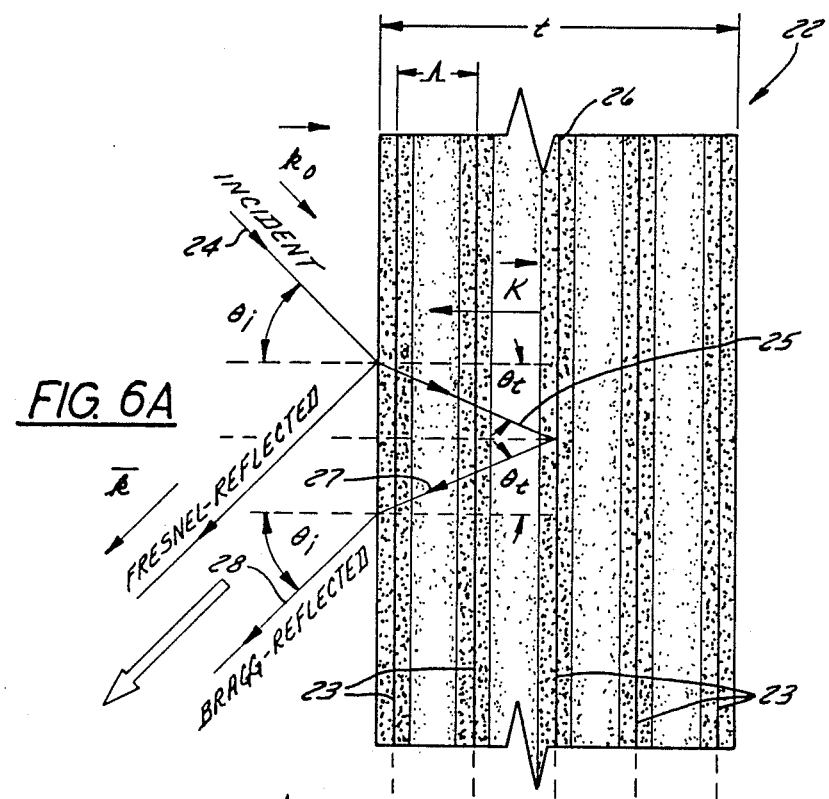
FIG. 6A
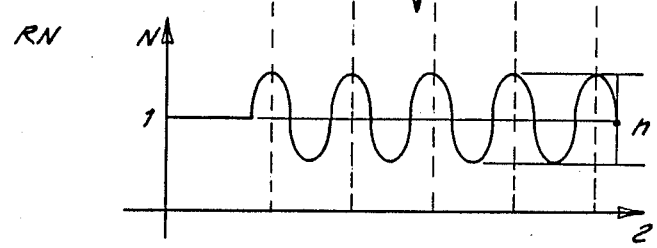
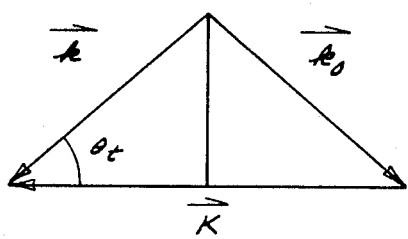
FIG. 6B

DIFFRACTION COHERENCE FILTER

TECHNICAL FIELD

The present invention relates generally to optical filters and is specifically directed to an optical filter capable of differentiating between coherent (e.g., laser) radiation and incoherent (e.g., ambient) radiation.

BACKGROUND ART

The optical filtering effect achieved in the present invention is based on the well known fact that light intensity spatial distribution in the interference region between two optical waves can change significantly depending upon the degree of mutual coherence of the interfering waves. This spatial distribution appears in the case of either wavefront division (related, for example, to Young's two-beam interference) or amplitude division (related to parallel plate interference, Fabry-Perot filter interference, dielectric multilayer interference and, finally, to Bragg hologram interference).

Simply speaking, the goal is to obtain an interference pattern for coherent illumination, e.g., laser light, and no interference for incoherent illumination, e.g., ambient light. The degree of coherence can then be used as the key parameter for determining the interference pattern in general and the division of reflected and transmitted beams in particular. The net result is a spectral response (i.e., reflectivity and transmitivity) from a plane parallel plate, Fabry-Perot filter, dielectric multilayer, or Bragg holographic structure which differs for coherent (laser) light relative to poorly-coherent (ambient) incident light. This phenomenon can be significantly amplified, assuming certain coherence/geometrical conditions are satisfied, leading to the optical coherence dependent filtering effect of the present invention.

SUMMARY OF THE INVENTION

It is therefore an object of the present invention to construct a filter which distinguishes between coherent and incoherent radiation.

It is another object of the present invention to construct a filter containing a diffraction structure which constructively interferes with incident illumination in the diffraction mode and destructively interferes with incident illumination in the transmission mode as a function of both temporal and spatial coherence of the incident illumination It is yet another object of the present invention to provide a method for making a filter capable of discriminating between coherent and incoherent radiation.

These and other objects of the present invention are realized by arranging a plurality of lower-hierarchy optical elements to form a higher-hierarchy compound optical structure in a manner such that mutual constructive interference of light occurs as a function of incident light wavelength. Each of the lower-hierarchy optical elements contains a series of interference structures, e.g., holographically recorded interference patterns. The interference structures are arranged within the optical elements, and the optical elements are spaced from one another, to take advantage of the difference in the optical paths of rays successively diffracted from corresponding interference structures in adjacent lower-hierarchy elements. The spatial distribution of the various interference structures and lower-hierarchy elements is governed according to a set of mathematical relationships which depend upon the spatial coherence radius and temporal coherence length of incoming radiation and the distances between rays successively diffracted from the corresponding interference structures. When the filter is constructed in accordance with the set of mathematical relationships, all of the lower-hierarchy elements in the filter can be coherently coupled for incident coherent light but will remain randomly coupled for incident incoherent light. That is, the interference structures within the lower-hierarchy elements will, when subjected to incident illumination, create constructive stationary interference in the diffraction mode and destructive interference in the transmission mode as a function of both the temporal and spatial coherence of the incident light. Thus, coherent light waves reflected from lower-hierarchy elements in the filter constructively interfere with coherent light waves diffracted by other elements, while destructive interference occurs between any coherent light waves transmitted through the elements. Conversely, when incoherent light strikes the filter, the lower-hierarchy elements will remain randomly coupled and little or no constructive interference will occur between light diffracted by or transmitted through the filter elements.

BRIEF DESCRIPTION OF THE DRAWINGS

The foregoing objects, features and advantages of the present invention will become more apparent upon consideration of the description provided in the Best Mode of Carrying Out Invention, taken in conjunction with study of the appended drawings, wherein:

FIG. 1 is a schematic representation generally depicting the operation of a filter constructed in accordance with the present invention;

FIG. 4 (A)–(I) depict a number of different Holographic Optical Elements suitable for use in constructing the filter of the present invention;

FIG. 5A schematically illustrates a filter constructed with fully-uniform non-Snellian Holographic Optical Elements in accordance with the teachings of the present invention;

FIG. 6A illustrates a single lower-hierarchy optical element of the type employed in a preferred embodiment of the present invention, wherein the optical element comprises a fully-uniform reflection subhologram in Lippmann geometry;

FIG. 6B depicts the vector relationships (e.g., the so-called Bragg condition) between the grating vector and the incident and diffracted wavevectors associated with a wavefront of light incident on the subhologram of FIG. 6A;

FIG. 7 provides a graphic representation of the interference which occurs in the reflection and transmissions modes for radiation in the temporal domain, using a preferred embodiment of the filter constructed with two subholograms;

BEST MODE FOR CARRYING OUT INVENTION

Figure 2A:
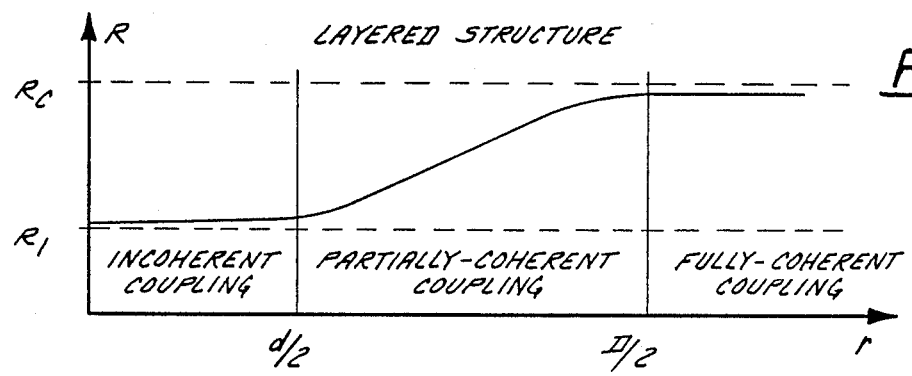
FIG. 2 depicts the reflection coefficient of a filter constructed in accordance with the present invention, charted as a function of spatial coherence radius of incident radiation.

An exemplary embodiment of the diffraction coherence filter of the present invention is illustrated in FIG. 1. Filter 2 is a higher-hierarchy compound optical structure comprised of some number N of lower-hierarchy optical elements 4. Lower hierarchy elements 4 are separated from one another by distance plates 6 fabricated from a transparent optical material such as glass, adhesive, plastic or air to form a total filter thickness T. If desired, filter 2 can be protected from the outside environment by an external protective covering of optical material (not shown in FIG. 1).

Generally speaking, a variety of different types of optical elements can be used as the lower-hierarchy elements 4 of filter 2. Each element 4 will characteristically contain a series of interference structures 8 which, when subjected to incident illumination, create constructive interference in the diffraction mode and destructive interference in the transmission mode as a function of both the temporal and spatial coherence of the incident illumination. Thus, as will be described more fully hereinbelow, elements 4 may comprise any type of Bragg structure, including uniform or non-uniform reflection or transmission Holographic Optical Elements (HOEs) in Lippmann or non-Lippmann geometry. Alternatively, each element 4 may be formed from non-holographic optical layers such as dielectric multilayers with rectangular refractive profiles, blazed gratings or some form of surface gratings.

When each lower-hierarchy element 4 of FIG. 1 is spatially distributed according to the teachings of the present invention, a higher-hierarchy compound optical structure is established in which mutual constructive interference of light occurs as a function of incident light wavelength. That is, with proper spatial distribution of elements 4, coherent (i.e., laser) light waves diffracted by one element 4 constructively interfere with coherent light waves diffracted by other elements 4. This is referred to as coherent coupling. For diffuse or incoherent (i.e., ambient) light, on the other hand, elements 4 are randomly coupled and there is little or no constructive interference between light waves diffracted by or transmitted through the various elements.

In order to achieve the critical spatial distribution of lower-hierarchy elements 4 within filter 2 necessary for coherent filtering, the distance L between elements 4 ($L=L_1, L_2, L_3 \ldots L_n$) must be carefully chosen relative to the degree of spatial and temporal coherence of the incident light radiation after taking spectral filtering into account. Generally speaking, L need not be identical for each separation between elements, although in the preferred embodiment equi-distant separations are employed ($L=L_1=L_2=L_3=L_n$).

For the first case in FIG. 1, the incident light 10 reaching filter 2 at angle of incidence $\theta_i$ is a highly-coherent light, e.g., laser illumination, characterized by spectrally filtered spatial coherence radius $r_c$ and temporal coherence length $l_c$. The radius of the area of spatial coherence for any type of illumination can be determined empirically as explained in Born and Wolf, *Principles of Optics* (Sixth Ed. Pergammon Press), pp. 491-554. Temporal coherence length $l_c$ for highly coherent light is calculated according to the equation:

$$l_c = \lambda_c^2 / \Delta\lambda_c \qquad (1)$$

where $\lambda_c$ is the peak wavelength (maximum intensity of the filter spectral characteristic) and $\Delta\lambda_c$ is the spectral bandwidth of the filter with respect to highly coherent light.

In the second case, incident light Il reaching filter 2 at angle $\theta_i$ is nearly incoherent in the fashion typical of ambient illumination, with spectrally filtered spatial coherence radius $r_i$ and coherence length $l_i$. Temporal coherence length $l_i$ for incoherent light is determined according to the equation:

$$l_i = \lambda_i^2 / \Delta\lambda_i \qquad (2)$$

where $\lambda_i$ is the peak wavelength of the filter spectral characteristics and $\Delta\lambda_i$ is the spectral bandwidth of the filter with respect to incoherent light.

Coherence filtering is established by observing an exploiting the difference in the optical paths of rays successively diffracted from corresponding interference structures in adjacent lower-hierarchy elements 4 for each wavefront of incident light. Examining FIG. 1, d is the distance along the normal between rays 12, 13 diffracted at an angle $\psi$ from corresponding interference structures 14, 15. D is the total distance across all rays diffracted from corresponding interference structures in all of the elements 4 for each wavefront of incident light reaching filter 2. If the following relationships are fulfilled:

$$2 r_i < d < 2 r_c \qquad (3)$$

$$l_i < \left[ \frac{L}{|\cos\psi|} \right] \cdot \left[ \left| 1 + \frac{1}{\cos(\theta_i + \psi)} \right| \right] < l_c \qquad (4)$$

each pair of elements 4 may be coherently coupled for highly-coherent light 10, but will be uncoupled for low-coherence light 11.

The coherent coupling effect can be amplified by optimizing the geometry of filter 2 relative to the total thickness T of the filter in a manner such that temporal coherence length $l_c$ of the highly-coherent light bears the following relation to T:

$$l_c > \left[\frac{T}{|\cos \psi|}\right] \cdot \left[\left|1 + \frac{1}{\cos(\theta_i + \psi)}\right|\right] \quad (5)$$

and spatial coherence radius $r_c$ is larger than D/2 (as well as d/2):

$$r_c > D/2 \quad (6)$$

Concomitantly, the temporal coherence length $l_i$ of incoherent light maintains the following relation to L:

$$l_i < \left[\frac{L}{|\cos \psi|}\right] \cdot \left[\left|1 + \frac{1}{\cos(\theta_i + \psi)}\right|\right] \quad (7)$$

while the radius of spatial coherence $r_i$ remains smaller than d/2:

$$r_i < d/2 \quad (8)$$

Figure 2B:
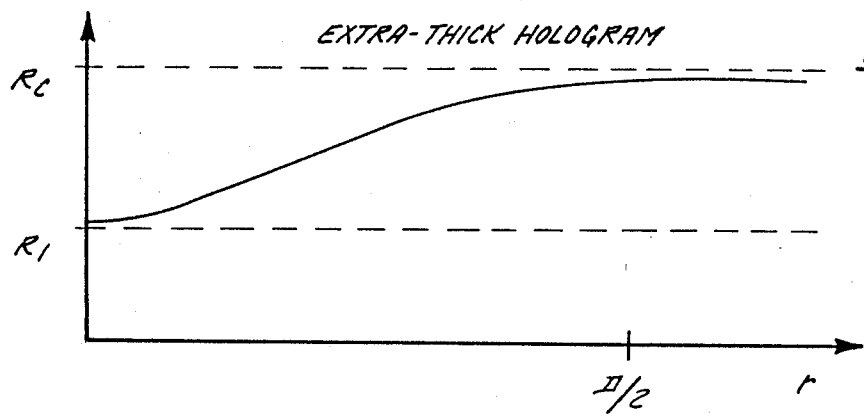

When Equations (3)–(8) are satisfied, all N lower-hierarchy elements in filter 2 may be coherently coupled for incident coherent light 10 and will remain uncoupled for incident incoherent light 11. The incident coherent light will therefore be highly reflected, as indicated at 16, but the incident incoherent light will exhibit low reflection, as indicated at 17. This phenomenon is illustrated in FIG. 2, which charts the reflection coefficient R of filter 2 as a function of spatial coherence radius of incident radiation. As can be seen in FIG. 2, the smaller the coherence radius, the lower the reflection coefficient. For values of r less than D/2, the reflection coefficient indicated as $R_i$ is at a minimum, i.e., an incoherent coupling situation exists and incident light, typically ambient in nature, will be largely transmitted through the filter. Conversely, where r is greater than D/2, conditions of fully-coherent coupling are met and the reflection coefficient, indicated as $R_c$ for incident coherent radiation, is high.

In a preferred embodiment of Figure lower-hierarchy elements 4 are fully uniform reflection subholograms in Lippmann geometry. Each of the subholograms can be thought of as a series of interference structures 8 in the form of Bragg planes containing holographically recorded interference patterns. Hereinafter, the Bragg planes, which are parallel to the subhologram surface, will also be referred to as Bragg-Lippmann holographic mirrors or holographic mirrors. The theory of each separate subhologram is described more fully in an article entitled "Coupled Wave Theory for Thick Hologram Gradings", by H. Kogelnik, published in the *Bell System Technical Journal* (Vol. 48, P.2902; 1969).

The difference between the intensity of coherent light reflected at 16 in FIG. 1 and incoherent light reflected at 17 in FIG. 1 can be roughly predicted. For the so-called "on-Bragg case", where the Bragg condition is satisfied for each separate reflection of coherent or incoherent light, the total intensity of the reflection for coherent light is approximated by:

$$R_c = N^2 R_o \quad (9)$$

with $R_c$ representing the intensity reflection coefficient of the total filter in the case of coherent light, $R_o$ representing the intensity reflection coefficient for each separate subhologram and N representing the number of subholograms in the total filter. In the case of incoherent light, the intensity reflection coefficient $R_i$ for the total filter will be approximately:

$$R_i = NR_o \quad (10)$$

The ratio of the total intensity of coherent light reflected to the total intensity of incoherent light reflected is proportional to the ratio of Equations (9) and (10), i.e.:

$$R_c/R_i = N \quad (11)$$

Figure 3:
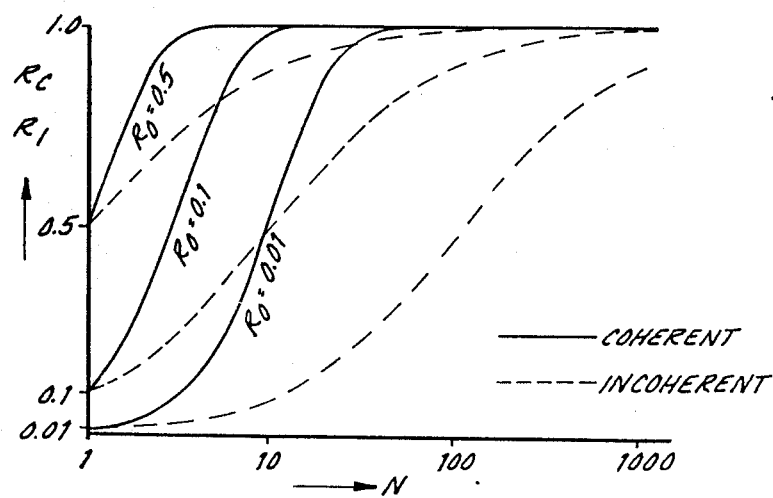
FIG. 3 illustrates the general relationship between the number of lower-hierarchy elements employed in the filter of the present invention and the intensity reflection coefficient obtained for both coherent and incoherent cases in the temporal domain.

In order to maximize the coherent discrimination effect of filter 2, the number N of subholograms should be high, whereas the intensity reflection coefficient $R_o$ for each subhologram should be kept relatively low to permit passage of a maximum amount of incoherent light through each subhologram. The general relationship between N and $R_o$ for both coherent and incoherent cases in the temporal domain is illustrated in FIG. 3.

As noted above, lower-hierarchy optical elements other than fully-uniform reflection subholograms 4 may be employed to construct the higher-hierarchy compound filter structure of the present invention. Various kinds of Holographic Optical Elements, or HOEs having either fully uniform or non-uniform configuration and either Lippmann or non-Snellian geometries may serve as elements 4 in the filter Alternately, as also noted above, elements 4 may be fabricated from dielectric multilayers. A number of different HOEs suitable for use in constructing the filter of the present invention are illustrated in FIGS. 4A–4I.

FIG. 5A depicts a diffraction coherence filter 18 made up of several fully-uniform non-Snellian reflection HOEs 19 of the type shown in FIG. 4B, whereby reflection of coherent and incoherent light occurs in slanted fashion As long as the critical spatial distribution requirements of Equations (3)–(8) are met, however, a compound filter fabricated from lower-hierarchy elements such as dielectric multilayers or the HOEs of FIGS. 4A–4I may function as a diffraction coherence filter, differentially transmitting coherent light relative to incoherent light.

Figure 5B:
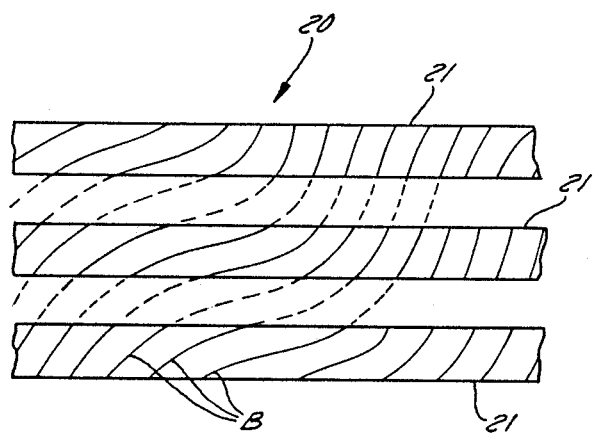
FIG. 5B shows a generalized version of a diffraction coherence filter.

A generalized version of a diffraction coherence filter embodying the principles of the present invention appears in FIG. 5B. Filter 20 is comprised of lower-hierarchy elements 21. Each element 21 contains a series of non-uniform curved holographic reflecting surfaces B, e.g., non-planar Bragg surfaces which locally satisfy the Bragg condition, arranged to provide coherent coupling for highly coherent light.

The principle of coherent coupling is best understood by reference to FIGS. 6A–6B and 7. FIG. 6A illustrates a single subhologram 22. For purposes of the present discussion subhologram 22 is assumed to be fully uniform structure in Lippmann geometry (such as illustrated in FIG. 4A). Hence, subhologram 22 is comprised of a series of Bragg planes of holographically recorded interference patterns 23. Brag planes 23 are separated from one another by the spatial period Λ, also called the grating constant. The value of the grating constant, which is a factor to be taken into account in explaining coherent coupling, can be determined by reference to physics principles governing the relationship between subhologram 22 and radiation incident thereon.

In the exemplary case of FIG. 6A, an incident wavefront 24 of light reaches subhologram 22 at slanted incidence characterized by angle $\theta_i$. Viewed locally, a portion of incident wavefront 24 passes into subhologram 22 at an angle $\theta_t$ relative to normal, indicated at 25 in FIG. 6A, and reaches a representative Bragg plane 26. $\theta_t$ is expressed as a function of $\theta_i$ according to the well-known Snell law:

$$\sin \theta_t = \frac{\sin \theta_i}{n} \quad (12)$$

where n is the average refractive index of subhologram 22. The remaining portion of incident wavefront 24 is reflected in Fresnel fashion from the surface of subhologram 22 Simultaneously, reflection of wavefront 25 reaching Bragg plane 26 occurs internal to subhologram 22, as indicated at 27 in FIG. 6A, and a second wavefront 28 emerges from the subhologram in Bragg-reflected fashion, as indicated at 28.

The Bragg reflection phenomenon internal to subhologram 22 can be expressed in vector form as the algebraic relationship between the grating vector $\vec{K}$, the incident wavevector $\vec{K}$, and the diffracted wavevector $\vec{K}_o$:

$$\vec{K} = \vec{K}(x, y, z) \quad (13)$$

where (x,y,z) are Cartesian coordinates.

$$\vec{K} = \vec{K} - \vec{K}_o \quad (14)$$

$$\frac{K}{2} = k \cos \theta_t \quad (15)$$

The vector relationship of the grating vector to the incident and diffracted wavevectors is illustrated in FIG. 6B. The length of $\vec{K}$ and $\vec{K}_o$ are determined as a function of the wavelength $\lambda$ of wavefront 24.

$$k = k_o = \frac{2\pi \cdot \overline{n}}{\lambda} \quad (16)$$

where $\overline{n}$ is again the average refractive index of the subhologram. Inasmuch as the grating constant $\Lambda$ is related to the grating vector:

$$K = 2\pi/\Lambda \quad (17)$$

the value of the grating constant is also determined as a three-dimensional function of (x,y,z) and incident radiation wavelength:

$$\Lambda = f'(x, y, z) \quad (18)$$

$$K = 2 \left( \frac{2\pi}{\lambda} \right) \cdot \overline{n} \cdot \cos \theta_t = \frac{2\pi}{\Lambda} \quad (19)$$

$$\Lambda = \frac{\lambda}{2\overline{n} \cdot \cos \theta_t} \quad (20)$$

Equation (20) thus provides the generalized expression of the grating constant for light reaching a subhologram at a slanted angle of incidence.

Viewing the situation locally, the phase relationship between the wavefronts incident and reflected from any given Bragg plane, e.g., Bragg plane 26 in FIG. 6A, depends upon the value of the grating constant. This latter principle is explained in conjunction with FIG. 7, which depicts the localized conditions of reflection within a subhologram structure for the special case of radiation reaching the subhologram surface at an angle normal to the plane of the surface, i.e., at angle of incidence $\theta_i = 0°$. FIG. 7 specifically reveals a diffraction coherence filter 30 having two subholograms 31, 32. Each subhologram again comprises a series of Bragg planes of holographically recorded interference patterns separated by the grating constant or spatial period $\Lambda$. A fully-uniform case is assumed for subholograms 31, 32, and hence $\Lambda$ does not change over the hologram volume. For simplicity, the same average refractive index $\overline{n}$ for each subhologram is likewise assumed.

Considering first a light ray or wavefront 34 reflected from the Bragg plane in subhologram 31 containing point A and comparing it with the wavefront 35 reflected from an adjacent Bragg plane containing point B, the phase relationship between the two reflected wavefronts can be expressed as:

$$\Delta \phi = \left( \frac{2\pi}{\lambda} \right) \cdot \overline{n} \cdot \left( \frac{2AB}{\cos \theta_t} \right) \quad (21)$$

where $\theta_t$ is the angle of incidence in the holographic medium and AB represents the distance between points A and B. Inasmuch as the distance between point A and point B is also equal to the Bragg constant, i.e.:

$$AB = \Lambda \quad (22)$$

and further in view of the fact that:

$$\Lambda = \frac{\lambda}{2\overline{n} \cdot \cos \theta_t} \quad (23)$$

Equation (22) can be reformulated as follows:

$$AB = \frac{\lambda}{2\overline{n} \cdot \cos \theta_t} \quad (24)$$

$$\frac{2 \cdot AB \cdot \overline{n}}{\cos \theta_t} = \lambda \quad (25)$$

Equation (21) can now be rearranged using Equation (25) above:

$$\Delta \phi = (2\pi/\lambda) \lambda \quad (26)$$

$$\Delta \phi = 2\pi \quad (27)$$

Thus, the wavefronts reflected from Bragg planes containing points A and B are in phase with one another. This situation creates constructive interference for reflected light, i.e., the wavefronts will be reflected coherently in spite of the fact that they are reflected from different Bragg planes. Conversely, the diffracted wavefronts will create destructive interference for transmitted light.

If the thickness L of the distance plate 36 separating subholograms 31 and 32 is set at some multiple w of $\Lambda$, where w is some integer (w=1,2,3 ... ), L can be expressed as:

$$L = \frac{w \cdot \lambda}{2n \cdot \cos \theta_t} \quad (28)$$

Now comparing the wavefront 37 reflected from the Bragg plane in subhologram 32 containing point C with the wavefront 38 reflected from the Bragg plane containing point A in subhologram 31, the phase relationship between the two reflected wavefronts is:

$$\Delta \phi \frac{2\pi \cdot n \cdot 2AC}{\lambda \cos \theta_t} \quad (29)$$

where AC represents the distance between points A and C. Because AC is the sum of the thickness of the distance plate, L, and some integer multiple m of $\Lambda$ represents the number of Bragg planes in subholograms 31 and 32 crossed by the wavefront between points A and C, $$AC = L + m\Lambda \quad (30)$$

$$AC = \frac{w \cdot \lambda}{2n \cdot \cos \theta_t} + \frac{m \cdot \lambda}{2n \cdot \cos \theta_t} \quad (31)$$

$$AC = (w + m) \frac{\lambda}{2n \cdot \cos \theta_t} = \frac{w' \cdot \lambda}{2n \cdot \cos \theta_t} \quad (32)$$

where w' is also an integer. Substituting Equation (32) in Equation (29) yields:

$$\Delta\phi = \frac{2\pi \cdot n \cdot 2w \cdot \lambda}{(\lambda \cdot \cos \theta_t)(2n \cdot \cos \theta_t)} \quad (33)$$

$$\Delta\phi = (2\pi/\lambda) w'\lambda \quad (34)$$

$$\Delta\phi = w'(2\pi) \quad (35)$$

Thus, provided Equation (28) is satisfied, two wavefronts reflected from Bragg planes respectively located in different subholograms 31 and 32 also reflect coherently, creating constructive interference between themselves in the reflection mode and destructive interference between themselves in the transmission mode.

The ability of a filter constructed from multiple subholograms to distinguish between coherent and incoherent light can be seen by examining Equation (35) and underlying Equation (28) in relation to Equations (1)–(8). In particular, equations (28) and (35) respectively are wavelength-dependent functions, permitting the interference relationship between subholograms in a diffraction filter constructed according to the present invention to be controlled as a function of incident wavefront coherence. In the case where the filter is constructed such that Equations (3), (4) and (5) are satisfied, that is, in the case where the total thickness T of the filter is adjusted such that coherence length $l_c$ is larger than twice the thickness T, the assumption can be made that:

$$l_c \gg 2L \quad (36)$$

Under these conditions, coherence filtering based on temporal coherence will occur. At the same time, when the thickness of the distance plates separating various subholograms in the filter is chosen according to Equation (4) for light wavelengths and associated coherence lengths in the visible spectrum, the selection of a distance plate thickness L which specifically does not satisfy Equation (28) will serve to prevent interference from occurring between adjacent subholograms in the filter in the case of incoherent light incident to the filter.

In the case where the filter is constructed such that Equations (3), (4) and (6) are satisfied, the spatial coherence area radius $r_c$ is larger than D/2. The assumption can then be made that $$r_c \gg 2d \quad (37)$$

Hence, coherence filtering based on spatial coherence can be achieved, and a coherence filter capable of creating differential internal reflection characteristics as a function of the coherence of incident light can be obtained.

Figure 8A:
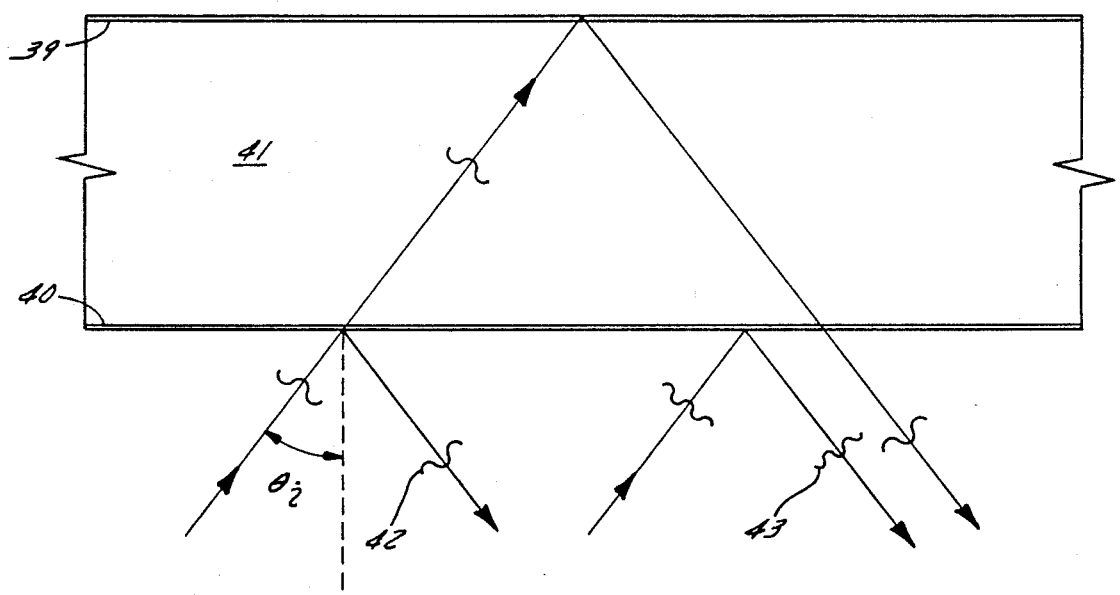
FIG. 8A depicts a filter comprised of two subholograms which receives incoming wavefronts at slanted angles of incidence in order to demonstrate the effect of spatial coherence on coherence filtering.
Figure 8B:
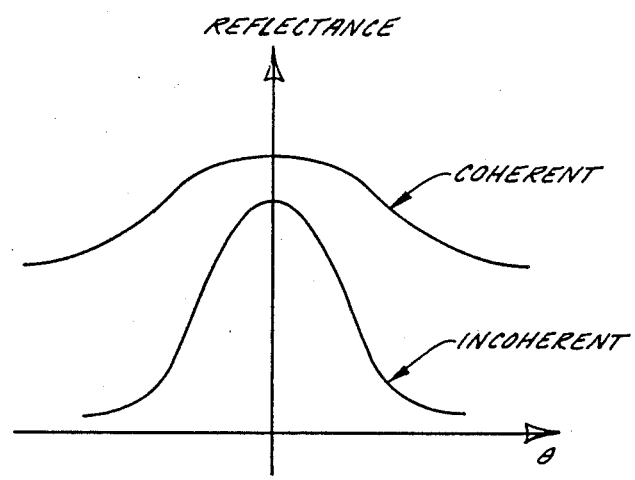
FIG. 8B charts reflectance of the filter as a function of incidence angle for both coherent and incoherent light.

FIG. 8A, like FIG. 6A, depicts the case of slanted incidence angles to better demonstrate the effect of spatial coherence on coherence filtering. In particular, two subholograms 39, 40 separated by a distance plate 41 receive first and second wavefronts of light 42, 43 at angle of incidence $\theta_i$. Regardless of the temporal coherence of wavefronts 42 and 43, the amount of interference between the two wavefronts will lessen as $\theta_i$ increases. Consequently, the angular characteristic for coherent radiation is narrower than for incoherent radiation. The latter phenomenon is illustrated in FIG. 8B, which empirically charts reflectance as a function of incidence angle for both coherent and incoherent light (if $\theta_i = 0$ of course, the pure case of the filter functioning in the temporal coherence domain occurs).

Figure 9A:
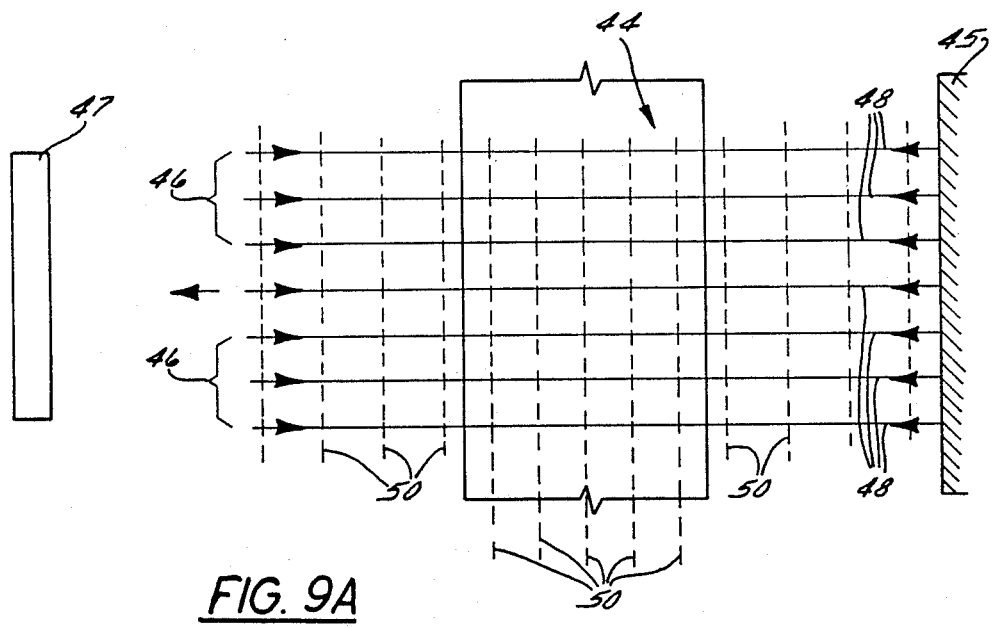
FIGS. 9A-9C illustrate a method for constructing a Lippmann subhologram for use in the filter of the present invention.
Figure 9B:
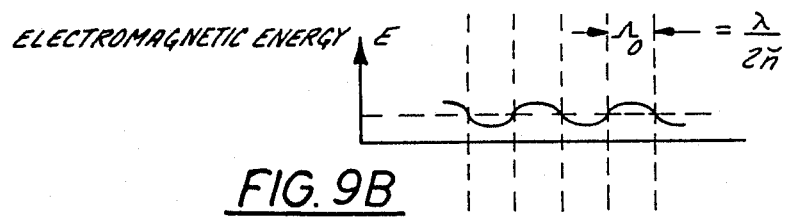
Figure 9C:
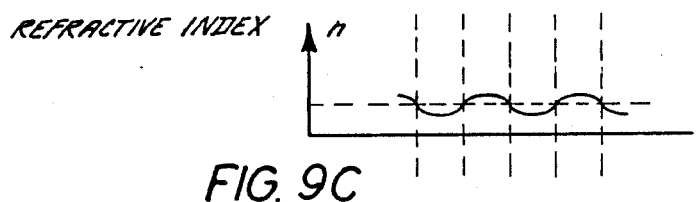

Fabrication of lower-hierarchy holographic elements for use in a preferred embodiment of the present invention, employing prior art standing wave holographic recording techniques, is illustrated in FIGS. 9A–9C. A photo sensitive holographic medium 44 is positioned in a predetermined distance from a mirror 45. Holographic medium 44 may comprise any suitable holographic material, i.e., a polymer such as PVA-based or dichromated gelatin (DCG) or a photo refractive crystal such as $LiNbO_3$, BSO or PLZT. Electromagnetic energy in the form of laser light (wavelength $\lambda_c$), indicated by arrows 46, is transmitted from a source 47 through holographic medium 44 to mirror 45 and is reflected back into the holographic medium from the surface of mirror 45, as indicated by arrows 48. The interaction of the incident wave energy and the reflected wave energy forms a standing wave pattern in the holographic medium, leading to a sinusoidal distribution of electromagnetic energy throughout the holographic medium as illustrated in FIG. 9B.

Regions in the holographic medium subjected to maximum intensity of the standing wave pattern alternate with the standing wave nodes. These nodes are illustrated at 50 in FIG. 9A. If the holographic medium is a polymer, the amount of polymeric cross-linking throughout the medium varies as a function of the standing wave electromagnetic energy intensity, leading to a corresponding variation in the hardness of the polymer across the thickness of medium 44. If, on the other hand, a photorefractive crystal is employed as the holographic medium, variations in the intensity of the standing wave electromagnetic energy produce a sinusoidal polarization effect throughout the medium. In either event, the refractive index n is modulated across the thickness of the holographic medium, as illustrated in FIG. 9C. A series of interference patterns in the form of holographic fringes or layers are thereby established at the standing wave nodes 50. These interference patterns, also known as volume or Bragg hologram patterns, create the lower-hierarchy holographic interference effect characteristically associated with each Bragg plane or holographic mirror utilized in the diffraction coherence filter of the present invention.

Figure 10A:
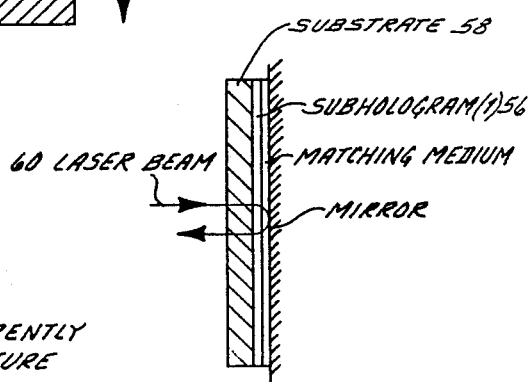
FIGS. 10A-10C illustrate a method for constructing multiple Lippmann subholograms of the type depicted in FIGS. 9A-9C to create a composite filter structure.
Figure 10B:
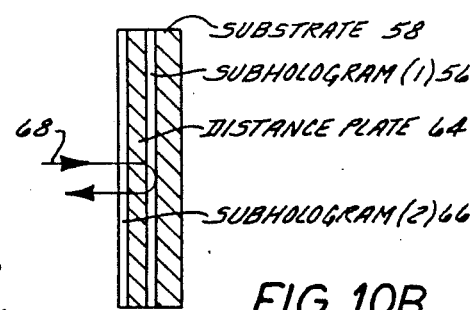
Figure 10C:
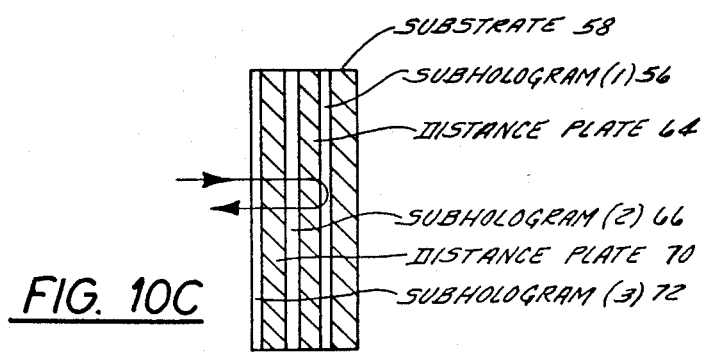

One mode of constructing a coherence diffraction filter using multiple holographic sub-structures or mirrors in accordance with the present invention is illustrated in FIG. 10A-10C. Turning first to FIG. 10A, the standing wave holographic recording technique of FIGS. 9A-9C is utilized to form a first subhologram 56. Subhologram 56 may, for example, comprise a holographic polymer material as described above, supported on an optically-transmissive substrate 58. The holographic material from which the subhologram 56 will be constructed is affixed to substrate 58 and positioned adjacent mirror 60 such that laser light, indicated at 62, can be transmitted through the holographic material and reflected back from the mirror to create the standing wave pattern discussed in connection with FIG. 9A. In this manner, Bragg planes of holographically recorded interference patterns are established in the medium to create first subhologram 56.

Separation material in the form of a distance plate 64 having thickness L is then disposed over the first subhologram 56 and a second layer of holographic material is supported by distance plate 64 to form a second subhologram 66, as seen in FIG. 10B. In particular, the standing wave pattern which establishes the Bragg plane interference patterns in second subhologram 66 is created by using first subhologram 56 as a holographic mirror for reflecting incident waves of laser light 68 passing through second subhologram 66 back into the second subhologram. When the standing wave holographic recording is completed and second subhologram 66 has been further processed to develop and fix the interference pattern, the resulting structure is a higher-hierarchy compound holographic structure with N=2. If Equations (3)-(8) above are satisfied, the first and second subholograms 56, 66 will be coherently coupled and incident light with wavelength adjusted to the Bragg condition (i.e., laser light) will be reflected from the subholograms in constructive mutually interfering fashion.

Additional subholograms can be formed by repeating the recording sequence of FIG. 10B. In FIG. 10C, a second distance plate 70 is disposed on second subhologram 66. A third subhologram 72 is thereafter created (N=3) by covering distance plate 70 with a holographic medium and establishing another standing wave pattern in medium, using both first and second subholograms 56, 66 as mirrors for recording the Bragg plane interference patterns in third subhologram 72. In this manner, a diffraction coherence filter containing any desired number of subhologram is constructed. For instance, a diffraction coherence filter with 15 (N=15) coherently coupled subholograms in Lippmann geometry can be seen if FIG. 11A. FIG. 11B shows a filter with 8 (N=8) coherently coupled subholograms in slanted (non-Snellian) geometry. Reference to the spatial coherence effect of the coherence filter explained in connection with FIG. 8B reveals greater discrimination between coherent and incoherent light in response to an increasing incidence angle. Accordingly, use of slanted geometry in the subholograms of the filter allows the number of subholograms to be reduced.

Figure 12:
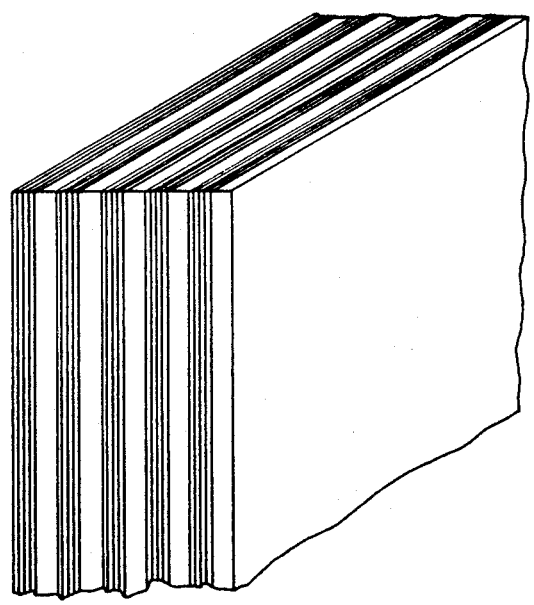
FIG. 12 is a perspective view of a diffraction coherence filter employing subholograms in Lippmann geometry.

FIG. 12 simply provides a perspective view of a diffraction coherence filter utilizing subholograms in Lippmann geometry.

Figure 13:
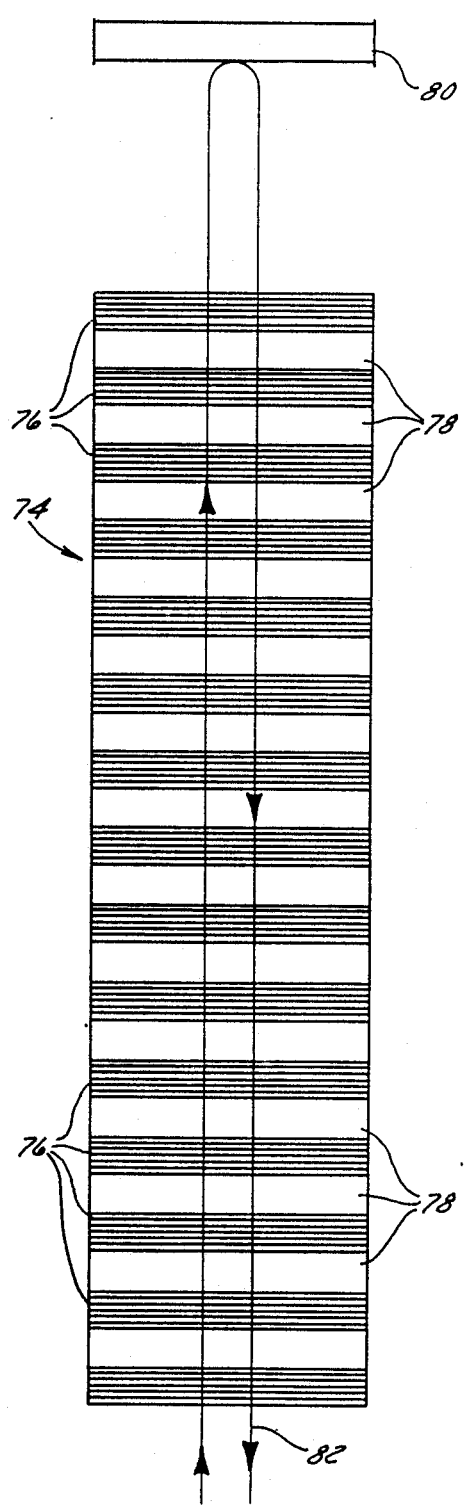
FIG. 13 depicts an alternative method for constructing the filter of FIG. 11A.
Figure 11A:
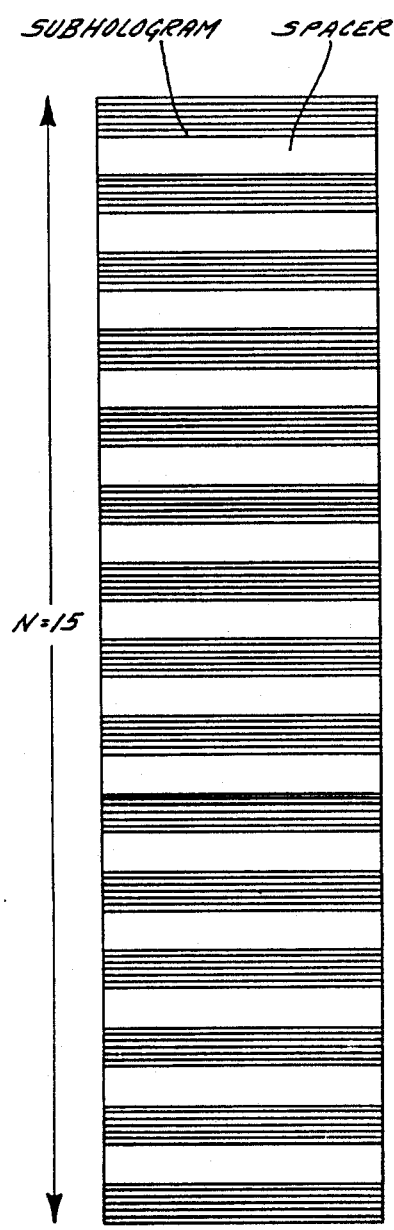
FIG. 11A is a drawing of a filter comprised of 15 coherently coupled subholograms in Lippmann geometry.
Figure 11B:
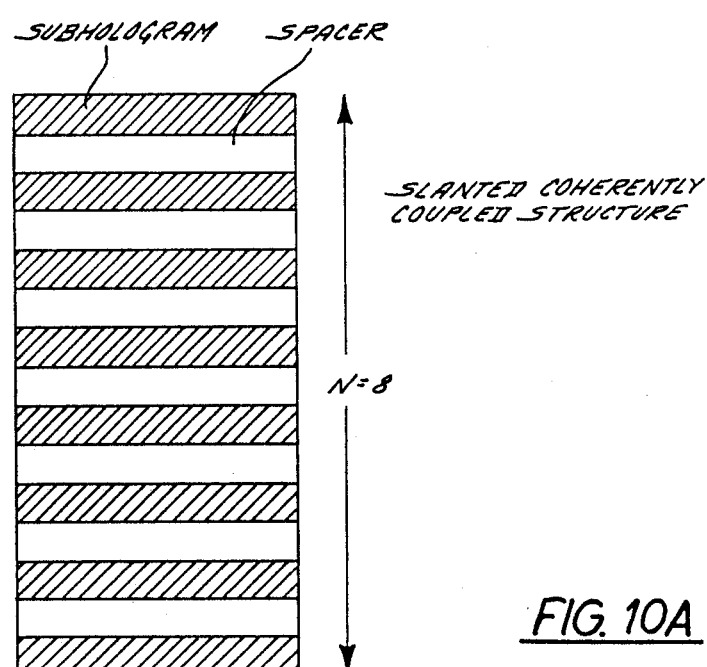
FIG. 11B is a filter with 8 coherently coupled subholograms in non-Snellian geometry.

An alternative method of constructing a coherence diffraction filter 74 of the type depicted in FIG. 11A is shown in FIG. 13. Filter 74 is built up by alternating layers of holographic media 76 with distance plates 78 until a desired total filter thickness is reached. The holographic media should be formed from a photosensitive substance, such as resin doped with alpha-diketones, which does not require any chemical processing after recording. Once the alternating architecture of what will become filter 74 is completed, a mirror 80 is oriented relative to the filter and the layers of holographic media are all simultaneously exposed to a standing wave pattern of light 82. The standing wave pattern interacts with the holographic media to record interference patterns, thereby creating subholograms or lower-hierarchy elements separated from one another by the distance plates.

Figure 15:
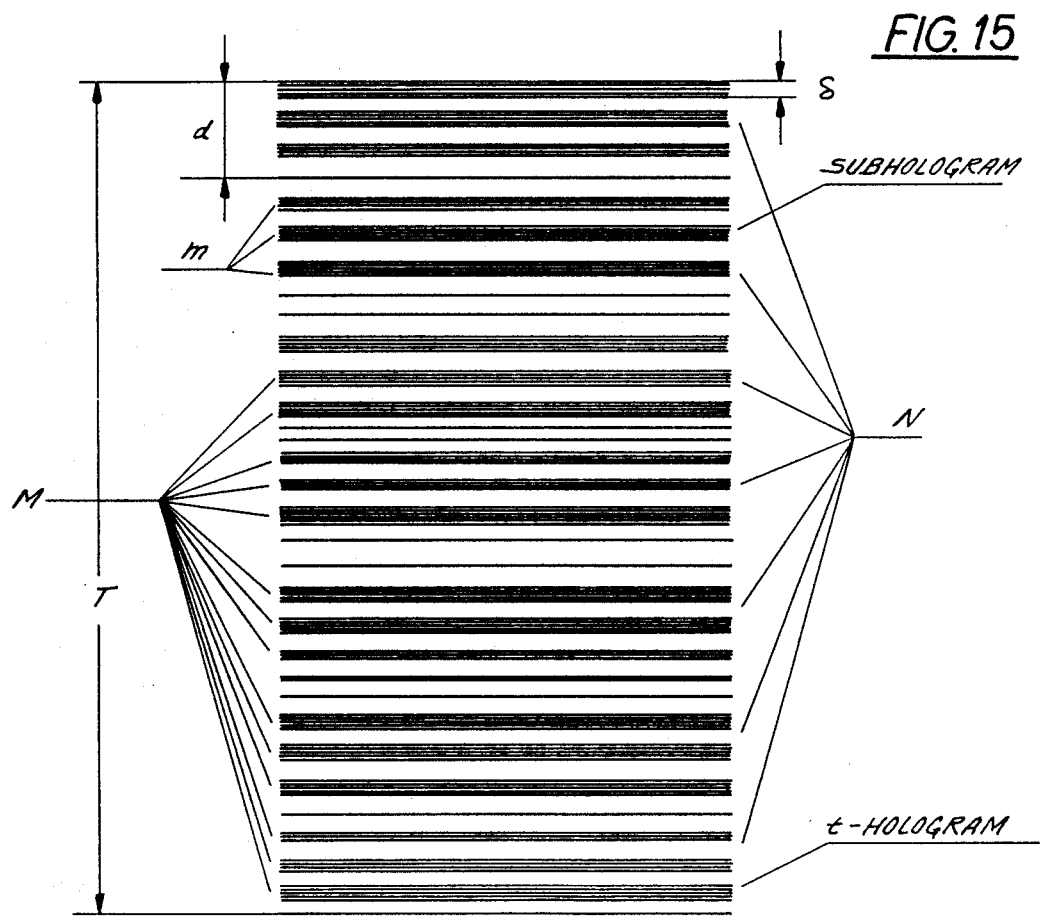
FIGS. 14A, 14B and 15 illustrate another modified method for constructing a diffraction coherence filter in accordance with the teachings of the present invention.
Figure 14A:
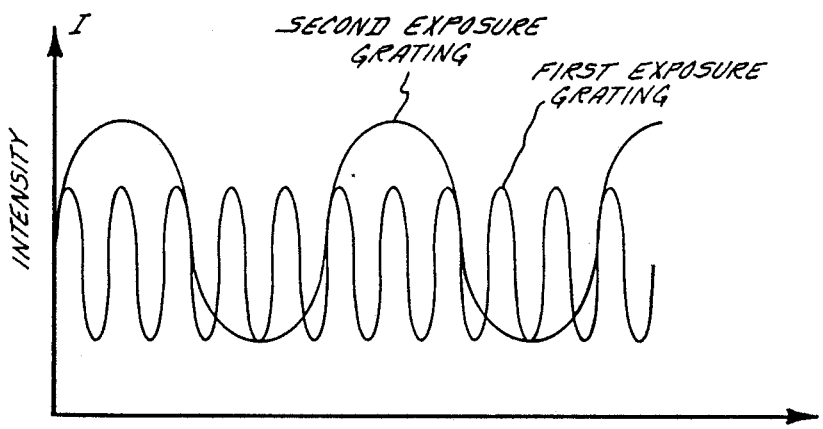
Figure 14B:
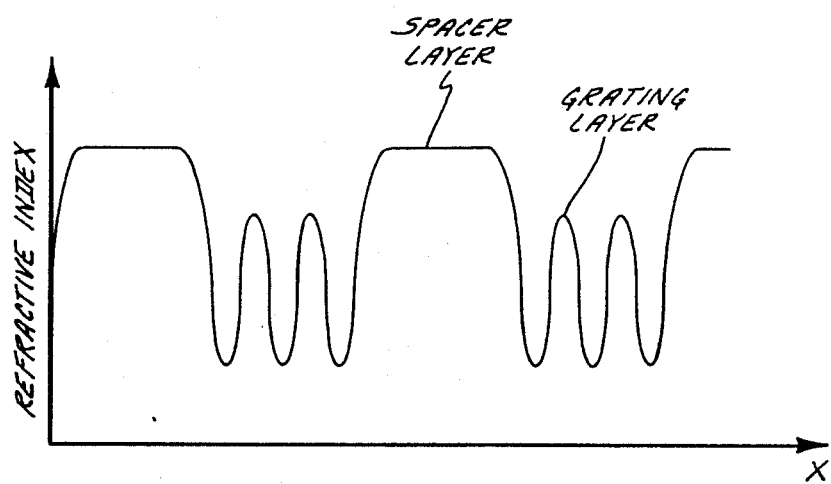

Another modified technique for constructing multiple subholograms in a diffraction coherence filter configuration is discussed in connection with FIGS. 14A-B and 15. Essentially, the technique consists of superimposing an additional grating exposure characterized by a very large spatial period (e.g., five microns) over a first grating exposure of the type required to establish the standing wave pattern responsible for creating the Bragg plane interference patterns in the subhologram of FIGS. 9A-9C. FIG. 14A demonstrates the relationship between the first and second grating exposures in terms of exposure intensity versus holographic medium thickness. The second exposure grating is optimized in a manner such that maximum intensity is located in a portion of the holographic medium exhibiting strong non-linear material characteristics. Some portions of the holographic medium will therefore be saturated, effectively "erasing" the holographic interference patterns in those areas to create spacer layers. FIG. 14B demonstrates this erasing effect. As a net result, each of the N subholograms in the filter are subdivided m times to create M sub-subholograms in effect holographically multiplying the total number of subholograms in the filter. Thus, as seen in FIG. 15, a double-hierarchical structure instead of a single-hierarchical structure, with a total of M (N)(m) sub-subholograms, is obtained. If the distance between each sub-subhologram is larger than $l_i/2$, and the total thickness of the filter is still smaller than $l_c/2$, Equations (3)-(11) hold true.

By way of example, assume a filter fabricated according to FIGS. 10A-10C with N=10 subholograms each having a thickness h=0.14mm (or 140 microns). If such a filter is subjected to exposure through a second grating with spatial period adjusted to subdivide each subhologram 10 times, each sub-subhologram will exhibit a 7-micron thickness and equivalent 7-micron spacing from adjacent sub-subholograms. The total number of sub-subholograms will be:

$$M = (N)(m) = 10 \times 10 = 100 \tag{38}$$

The total thickness T of the filter containing these 100 sub-subholograms will be:

$$T = 100(7\mu + 7\mu) \quad (39)$$

$$T = 1.4 mm \quad (40)$$

As long as the coherence radius $r_i$ of incoherent light incident to the filter is less than half the distance d between adjacent incident wavefronts for a given angle of incidence $\theta_i$ (e.g. $\theta_i = 30°$), i.e., as long as:

$$r_i < d/2 \quad (41)$$

$$r_i < (L/2)\sin 2\theta_i \quad (42)$$

$$r_i < 0.6 \text{ meters} \quad (43)$$

and as long as the coherence radius $r_c$ of highly-coherent light is greater than half the total distance D across all incident wavefronts, i.e., as long as:

$$r_c > D/2 \quad (44)$$

$$r_c > (T/2)\sin 2\theta_i \quad (45)$$

$$r_c > 60 \text{ meters} \quad (46)$$

then, according to Equations (9)–(11), the reflection coefficient $R_c$ for coherent light will be approximately 100 times larger than the reflection coefficient $R_i$ for incoherent light.

The present invention has been set forth in the form of several preferred embodiments. It is nevertheless understood that modifications to the structure and methods for making the diffraction coherence filter disclosed herein may be made by those skilled in the art without departing from the scope and spirit of the present invention. Moreover, such modifications are considered to be within the purview of the appended claims.

What is claimed is:

1. A filter apparatus capable of distinguishing between highly-coherent and incoherent radiation reaching the filter apparatus at angle of incidence $\theta_i$, the highly-coherent radiation characterized by spatial coherence radius $r_c$ and temporal coherence length $l_c$ and the incoherent radiation characterized by spatial coherence radius $r_i$ and temporal coherence length $l_i$, the apparatus comprising:

a plurality of diffraction optical elements separated from each other by a distance L such that $$l_i < [L/|\cos\phi|] \cdot [|1 + |/\cos(\theta_i + \phi)|] < l_c$$

and $$2r_i < d < 2r_c$$

where d is the distance between successive diffractions of incident radiation wavefronts from each of said diffraction optical elements and $\psi$ is the angle at which incident radiation wavefronts are diffracted from each of said diffraction optical elements said plurality of diffraction optical elements further being arranged to comprise a higher-hierarchy structure of total thickness T such that $$l_c > [T/|\cos\phi|] \cdot [|1 + 1/\cos(\theta_i + \psi)|]$$

and $$r_c > D/2$$

where D is the total distance across all rays diffracted from all of the optical elements.

2. A method for constructing a diffraction coherence filter from holographic media, said method comprising the steps of:

forming a first layer from the holographic medium;

transmitting electromagnetic energy through said first layer;

reflecting from a surface adjacent said first layer the electromagnetic energy transmitted through said first layer back into the holographic medium of said first layer to form a standing wave pattern therein such that an interference pattern is established in the holographic medium;

forming a second layer comprised of a holographic medium and positioning said second layer at a predetermined distance from said first layer;

transmitting electromagnetic energy through said second layer;

reflecting from a surface adjacent said first layer said electromagnetic energy transmitted through said second layer from said first layer back into the holographic medium of said second layer to create said interference pattern in the holographic medium of said second layer; and repeating said steps of forming layers comprised of holographic medium and transmitting electromagnetic energy through said layers so formed for reflection from the preceding layer of holographic medium back into said layer so formed to create said interference patterns until a predetermined number of layers of holographic medium with interference patterns established therein have been formed.

3. A method for fabricating a diffraction coherence filter from a holographic medium, said diffraction coherence filter functioning to distinguish between coherent and incoherent radiation, said method comprising the step of:

exposing the holographic medium to electromagnetic energy through a first grating structure to create a first standing wave pattern throughout the holographic medium such that holographic interference patterns would otherwise be established throughout the holographic medium in accordance with said first standing wave pattern; and exposing the holographic medium to electromagnetic energy through a second grating structure to create a second standing wave pattern throughout the holographic medium, said second grating structure characteristically exhibiting a large spatial period relative to the spatial period of said first grating structure, which large spatial period causes the maximum intensities of said second standing wave pattern to occur in portions of the holographic medium exhibiting strong non-linear material characteristics, effectively erasing said holographic interference patterns established by said first standing wave pattern in said portions of said holographic medium such that a series of holographic layers alternating with non-holographic spacer layers is formed in the holographic medium.

4. A method for fabricating a diffraction coherence filter from holographic media, said diffraction coherence filter functioning to distinguish between coherent and incoherent radiation, said method comprising the steps of:

building up a filter structure to a predetermined thickness by alternating layers of holographic media with distance plates to provide separation between each of said layers of holographic media, each of said layers of holographic media comprising a holographic substance which does not require any chemical processing after holographic recording;

transmitting electromagnetic energy through said filter structure and reflecting from a surface adjacent said first layer said electomagnetic energy so transmitted back into said filter structure to form a standing wave pattern in each of said layers of holographic media such that holographic intereference patterns are simultaneously established in each of said layers of holographic media.

* * * * *